US011248463B2

(12) United States Patent
Forstner et al.

(10) Patent No.: US 11,248,463 B2
(45) Date of Patent: Feb. 15, 2022

(54) EVALUATION OF SENSORS BASED ON CONTEXTUAL INFORMATION

(71) Applicants: Ingo Forstner, Ahnsbeck (DE); Christian Fulda, Sehnde (DE)

(72) Inventors: Ingo Forstner, Ahnsbeck (DE); Christian Fulda, Sehnde (DE)

(73) Assignee: BAKER HUGHES, A GE COMPANY, LLC, Houston, TX (US)

( * ) Notice: Subject to any disclaimer, the term of this patent is extended or adjusted under 35 U.S.C. 154(b) by 1165 days.

(21) Appl. No.: 15/204,089

(22) Filed: Jul. 7, 2016

(65) Prior Publication Data

US 2018/0010450 A1 Jan. 11, 2018

(51) Int. Cl.
*E21B 49/00* (2006.01)
*E21B 47/00* (2012.01)
*G01V 1/00* (2006.01)
*G01V 13/00* (2006.01)

(52) U.S. Cl.
CPC ............ *E21B 49/005* (2013.01); *E21B 47/00* (2013.01); *G01V 1/00* (2013.01); *G01V 13/00* (2013.01); *G01V 2200/14* (2013.01)

(58) Field of Classification Search
CPC .......... E21B 49/005; E21B 47/00; G01V 1/00
See application file for complete search history.

(56) References Cited

U.S. PATENT DOCUMENTS

| | | | |
|---|---|---|---|
| 3,868,505 A | 2/1975 | Jacobson et al. | |
| 6,772,082 B2 | 8/2004 | van der Geest et al. | |
| 6,892,812 B2 | 5/2005 | Niedermayr et al. | |
| 8,204,697 B2 | 6/2012 | Garvey et al. | |
| 2003/0209365 A1* | 11/2003 | Downton | E21B 47/00 175/50 |

(Continued)

FOREIGN PATENT DOCUMENTS

| | | |
|---|---|---|
| WO | 2009089150 A2 | 7/2009 |
| WO | 2016019219 A1 | 4/2016 |
| WO | 2016089523 A1 | 6/2016 |

OTHER PUBLICATIONS

Ambrus et al, "Drilling Rig Sensor Data Validation in the Presence of Real-Time Process Variations", 2013. (Year: 2013).*

(Continued)

*Primary Examiner* — Regis J Betsch
*Assistant Examiner* — Jeremy A Delozier
(74) *Attorney, Agent, or Firm* — Cantor Colburn LLP (57) ABSTRACT

An embodiment of a method of performing aspects of a downhole operation includes receiving a measurement value from a first sensor configured to measure a parameter related to the downhole operation, receiving measurement data from a different sensor, the measurement data related to the downhole operation, and performing, by a sensor evaluation module, an evaluation of the first sensor. The evaluation includes determining a condition of the first sensor based on the measurement data from the different sensor, selecting a rule that prescribes a set of one or more measurement values of the parameter that are plausible if the condition is met, and determining whether the measurement value from the first sensor is plausible based on comparing the measurement value to the prescribed set of one or more measurement values.

20 Claims, 2 Drawing Sheets

(56) References Cited

U.S. PATENT DOCUMENTS

| | | |
|---|---|---|
| 2009/0299654 A1* | 12/2009 | Garvey .................. E21B 41/00 |
| | | 702/34 |
| 2010/0206063 A1 | 8/2010 | Fujisawa et al. |
| 2011/0226531 A1* | 9/2011 | Jones .................... E21B 47/082 |
| | | 175/50 |
| 2013/0173167 A1 | 7/2013 | Abitrabi et al. |
| 2014/0052290 A1 | 2/2014 | Dirksen |
| 2014/0121973 A1 | 5/2014 | Buchanan et al. |
| 2015/0167454 A1 | 6/2015 | Kale et al. |
| 2016/0003028 A1 | 1/2016 | Aklestad et al. |

OTHER PUBLICATIONS

International Search Report; International Application No. PCT/US2017/039217; dated Oct. 26, 2017, 3 pages.

Written Opinion of the International Search Report; International Application No. PCT/US2017/039217; dated Oct. 26, 2017, 8 pages.

Ashok, et al.; "Automatic Sensor Data Validation: Improving the Quality and Reliability of Rig Data"; Mar. 2013; SPE 163726; 14 pages.

Bouleau, et al.; "The Big Picture: Integrated Asset Management";Winter 2007/2008; Oilfield Review; 15 pages.

* cited by examiner

EVALUATION OF SENSORS BASED ON CONTEXTUAL INFORMATION

BACKGROUND

Various operations are performed by the energy industry to evaluate earth formations and produce hydrocarbons. Such operations include drilling, stimulation and production. Various types of sensor devices and logging tools are utilized by the energy industry in order to evaluate earth formations and reservoirs, for purposes such as exploration, formation evaluation, stimulation and production. Examples of sensing devices include temperature sensors, pressure sensors, resistivity tools, gamma density tools, neutron porosity tools, sonic and acoustic logging tools and pulsed neutron tools.

Accurate sensor readings are critical for effective operations. Downhole sensors can be exposed to harsh environmental conditions and thus can have a significant risk of failure, which can result in inaccurate measurements. As many sensors can have a large range of plausible values at different depths and environments, it can be challenging to identify a failed sensor without retrieving the sensors.

BRIEF SUMMARY

An embodiment of a method of performing aspects of a downhole operation includes receiving a measurement value from a first sensor configured to measure a parameter related to the downhole operation, receiving measurement data from a different sensor, the measurement data related to the downhole operation, and performing, by a sensor evaluation module, an evaluation of the first sensor. The evaluation includes determining a condition of the first sensor based on the measurement data from the different sensor, selecting a rule that prescribes a set of one or more measurement values of the parameter that are plausible if the condition is met, and determining whether the measurement value from the first sensor is plausible based on comparing the measurement value to the prescribed set of one or more measurement values.

An embodiment of a system for performing aspects of a downhole operation includes a first sensor configured to measure a parameter related to the downhole operation, a different sensor configured to generate measurement data related to the downhole operation, and a sensor evaluation module configured to receive a measurement value from the first sensor and the measurement data from the different sensor and perform an evaluation of the first sensor. The evaluation includes determining a condition of the first sensor based on the measurement data from the different sensor, selecting a rule that prescribes a set of one or more measurement values of the parameter that are plausible if the condition is met, and determining whether the measurement value from the first sensor is plausible based on comparing the measurement value to the prescribed set of one or more measurement values.

BRIEF DESCRIPTION OF THE DRAWINGS

The following descriptions should not be considered limiting in any way. With reference to the accompanying drawings, like elements are numbered alike.

DETAILED DESCRIPTION

Systems and methods are described herein for evaluating surface and/or downhole sensors during an energy industry operation, such as a drilling, production, formation evaluation, wireline or logging-while-drilling operation. An embodiment of a method includes receiving measurement data from a sensor and evaluating the sensor, which includes determining whether the measurement data is plausible or sensible based on contextual information that provides information regarding the environment that the sensor is in. Contextual information may include surface and/or downhole sensor values from different sensors (e.g., sensors located at a different location than the sensor to be evaluated and/or sensors that perform measurements of different parameters or properties than the sensor to be evaluated) or from other sources (e.g., previous measurements, information from previous operations, known properties of the formation or borehole, known properties of similar formations or boreholes, etc.). In one embodiment, the method is a rule-based method that evaluates sensor readings based on one or more pre-selected rules that relate plausible measurement values to an environmental condition.

Embodiments described herein may be performed automatically to relieve operators of the task of performing manual checks. For example, sensor evaluation methods can be performed at pre-selected times, during different phases of an operation and/or can be triggered by an environmental condition. The embodiments described herein do not simply check for failure, but evaluate sensor readings in the context of their environment to determine whether the sensor readings are plausible or sensible.

Figure 1:
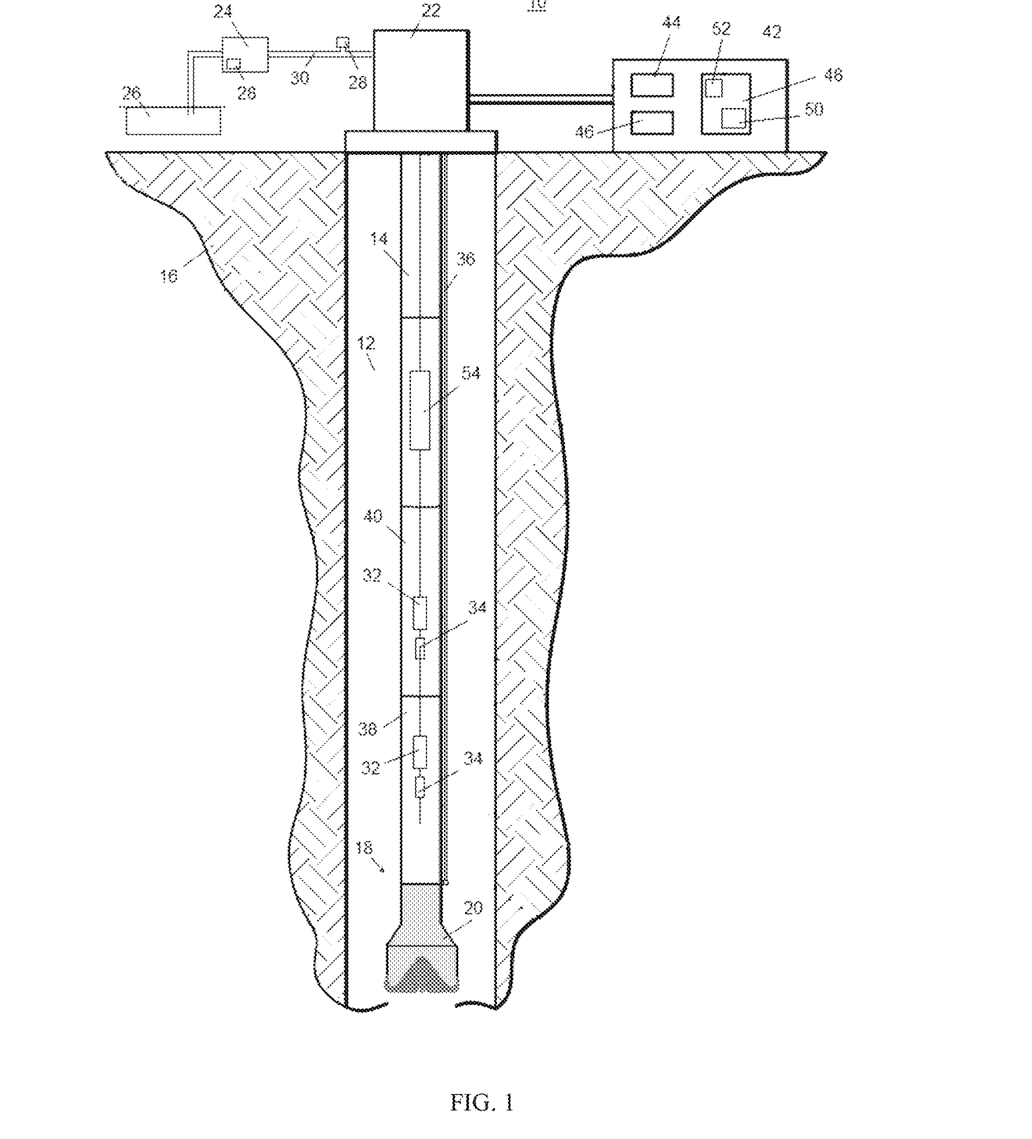
FIG. 1 depicts an embodiment of a well logging, production and/or drilling system.

FIG. 1 illustrates an example of a system 10 that can be used to perform one or more energy industry operations. The system 10 in this example is a drilling system that includes a drill string 14 disposed in a borehole 12 that penetrates at least one earth formation 16. Although the borehole 12 is shown in FIG. 1 to be of constant diameter, the borehole is not so limited. For example, the borehole 12 may be of varying diameter and/or direction (e.g., azimuth and inclination). The drill string 14 is made from, for example, a pipe, multiple pipe sections or coiled tubing. The system 10 and/or the drill string 14 includes various downhole components or assemblies, such as a drilling assembly (including, e.g., a drill bit and mud motor) and various measurement tools and communication assemblies, one or more of which may be configured as a bottomhole assembly (BHA) 18. Although the system 10 is described as a drilling system, it is not so limited and can be any type of energy industry system, such as wireline or production system. The various measurement tools may be included for performing measurement regimes such as wireline measurement applications, logging-while-drilling (LWD) applications and measurement-while-drilling (MWD) applications. Sensors may be disposed at one or multiple locations along a borehole string, e.g., in the BHA 18, in the drill string 14, in a logging sonde conveyed into the borehole via a wireline, or as distributed sensors in a drill string 14, wireline or other component.

In one embodiment, the drill string 14 drives a drill bit 20 that penetrates the earth formation 16. Downhole drilling fluid, such as drilling mud, is pumped through a surface assembly 22 (including, e.g., a derrick, rotary table or top drive, a coiled tubing drum and/or standpipe) from a mud pit 26 or other source into the drill string 14 using one or more pumps 24, and returns to the surface through the borehole 12.

Sensors may be disposed at or deployed with the system 10 for controlling and monitoring aspects of an operation or for formation evaluation. Sensors may be disposed at the surface and/or downhole. For example, sensors 28 are disposed at the pump 24, at a fluid line 30 and/or downhole for measuring properties of fluids (e.g., pressure, temperature and/or flow rate).

Various types of sensors may be included downhole for measuring parameters related to the downhole environment. In one embodiment, the drill string 14 includes one or more discrete strain sensors 32 located at various positions along the drill string, and may also include one or more discrete temperature sensors 34 located at various positions. The system may also include one or more distributed sensor systems (in place of or in addition to the non-distributed sensors). As a non-limiting example, the system includes one or more optical fiber sensors 36 that extend along the drill string, which can be used to obtain distributed temperature, pressure and/or strain data. The strain sensors can be used, e.g., to measure torque, pressure and other properties of the borehole and/or drill string. The sensors can be configured to measure properties of the borehole, formation, borehole fluid (both within the drill string bore and/or in the annular space between the drill string and the borehole wall) and/or the drill string. The sensors might be located within the wall of the drill string, in the annular space between the drill string and the borehole wall, in the drill string bore and/or in the formation. It is noted that the number and type of sensors described herein are exemplary and not intended to be limiting, as any suitable type and configuration of sensors can be employed to measure properties.

Other types of sensors or sensing devices may be incorporated in the system and/or drill string. For example, the drill string 14 includes a resistivity tool 38 for bulk resistivity and/or resistivity imaging, and an orientation sensing tool (including e.g., magnetometers, accelerometers). The drill string may also include a gamma ray or density tool 40. A caliper may also be incorporated into the drill string for measuring, e.g., borehole diameter and/or casing conditions.

The sensors and tools shown in FIG. 1 are examples provided for illustrative purposes and are not intended to be limiting. Any number or type of sensor and/or tool may be incorporated into the drill string 14 and/or system. Other examples of devices that can be used to perform measurements include pulsed neutron tools, acoustic tools, nuclear magnetic resonance tools, seismic data acquisition tools, acoustic impedance tools, formation pressure testing tools, fluid sampling and analysis tools, coring tools and/or any other type of sensor or device capable of providing information regarding a formation, borehole and/or operation.

A processing unit 42 is connected in operable communication with components of the system 10 and may be located, for example, at a surface location. The processing unit 42 may also be incorporated in the drill string 14 or the BHA 18, or otherwise disposed downhole as desired. Components of the drill string 14 or other borehole string may be connected to the processing unit 42 via any suitable communication regime, such as mud pulse telemetry, electromagnetic telemetry, wired links (e.g., hard wired drill pipe or coiled tubing), wireless links, optical links or others. The processing unit 42 may be configured to perform functions such as controlling drilling and steering, transmitting and receiving data, processing measurement data and/or monitoring operations. The processing unit 42, in one embodiment, includes a processor 44 and a data storage device (or a computer-readable medium) 46 for storing data, models and/or computer programs or software 48. In one embodiment, the storage device 46 or other suitable storage stores an evaluation module 50 and/or a set of rules 52 that may be used in performing sensor evaluations as described herein. Other processing devices may be included downhole, such as downhole electronics 54.

In one embodiment, a processing device or processor, such as the processing unit 42 and/or downhole electronics 54, is configured to perform a sensor evaluation, which includes determining whether readings from a sensor of interest are plausible or sensible in the context of the environment in which the sensor is located. The environment or aspects thereof can be determined based on, e.g., one or more other sensors (which measure a different parameter than the sensor being evaluated). In one embodiment, a sensor of interest (e.g., a downhole or surface sensor) is evaluated by acquiring readings or measurements from the sensor of interest, and determining whether the measurements are plausible based on data acquired from one or more different sensors. As described herein, a "sensor" refers to any type or configuration of a device or system that is capable of measuring a condition or property. A "different sensor" refers to a sensor that measures a parameter that is different than the parameter of the sensor of interest, or a sensor that measures the same parameter but at a different location, a different time or with a different accuracy. The processing device may be configured to perform sensor evaluations (also referred to as health checks) automatically, e.g., at periodic intervals or in response to some trigger.

For example, in a directional drilling operation, a drill string may include multiple inclination sensors, including a sensor that measures inclination at a relatively high accuracy and another sensor that measures inclination at a relatively low accuracy. Typically, the high accuracy sensor is preferred. During the drilling, the processing device checks the health or evaluates the high accuracy sensor by evaluating whether high accuracy sensor readings are plausible based on the surrounding environment. If the high accuracy sensor readings are not within a range or set of plausible values (or correspond to values that are considered to be implausible), the processing device can take suitable action, such as re-calibrating the high accuracy sensor or switching to the low accuracy sensor for inclination readings.

The sensor of interest can be disposed at a surface or downhole location during an energy industry operation. In one embodiment, the sensor of interest is a device that is configured to be disposed at the surface or downhole during a drilling operation. Sensors can be particularly susceptible to failure or damage during drilling, and determination of whether sensor readings are plausible can be especially challenging in a drilling environment. For example, telemetry in drilling environments can have extremely low bandwidth, and conditions such as temperature, pressure and vibration can be more significant in drilling environments. Although embodiments described herein are discussed in relation to drilling operations, they are not so limited and can be applied to any energy industry operation, such as a reservoir management operation, a wireline operation, a completion operation, a stimulation operation and a production operation.

The sensor of interest may produce measurements representing or related to any number or type of parameters. The parameters may include or be related to formation measurements, environment measurements and component measurements. A component is any device or system that is utilized at the surface or deployed downhole during an operation. Examples of formation measurements include resistivity, acoustic properties, nuclear magnetic resonance (NMR), density, porosity, permeability, formation fluid viscosity, nuclear and other measurements. Examples of environment measurements include pressure, temperature, mud properties (e.g., mud resistivity, mud viscosity, mud density, mud slowness, etc.) and other measurements. Example of component measurements include weight on bit (WOB), rotation per minute (RPM), torque, vibration including torsional oscillation, azimuth, inclination, toolface, and other measurements. In addition, the measurement data from the different sensor (whose readings are used to the second sensor) used to provide context can be any of these measurements.

The processing device performs an automated evaluation using an algorithm or instructions to determine whether a measurement value from a sensor of interest makes sense in the context of the environment. The processing device, based on this evaluation, can perform various actions, such as automatically flagging sensor readings that are not plausible, i.e., do not make sense based on the input of one or more different sensors or other information relating to the environment.

In one embodiment, the evaluation of a sensor measurement is rule-based, and the processing device evaluates a sensor by comparing measurement values from the sensor to reference values prescribed by one or more rules. Each rule prescribes a set of measurement values or a range of measurement values (reference values) that are plausible (or conversely are implausible) based on the data from the different sensor. The condition may be determined based on measurements performed by one or more different sensors.

Each rule can prescribe which values are plausible (or which values are implausible) based on environmental measurements from one or more different sensors that provide an indication of an environmental condition. The rule can be based on an environmental measurement from a single sensor or a single parameter, or based on multiple sensors or parameters. The rule can, for example, describe behaviors of measurement values for a condition (e.g., increasing or decreasing measurement values) or describe relationships (e.g., higher or lower than another measurement value).

A rule may be in the form of an If-Then statement or other conditional statement. For example, a rule may be in the form of "IF some condition is realized, THEN the measurement value should be within some range." Another example may be "IF some condition is realized, THEN the measurement value should exhibit some behavior."

The rules may be pre-selected (i.e., prior to performing the operation or a phase of the operation) and/or created by the processing device at any time or based on a user request.

In one embodiment, the processing device stores or has access to a number of rules that can be pre-selected or generated by the processing device. For example, the processing device includes an evaluation module stored in a computer, such a personal computer, or stored in a shared device, e.g., in a host server. The evaluation module can receive measurement data from a sensor of interest and one or more different sensors, and determine a condition of the sensor environment based on the one or more different sensors. A set of rules may be stored in the computer, the host server or a remote device in any suitable formation, such as a look-up table or database. The evaluation module accesses the set of rules and determines whether a rule applies to the condition. If so, the evaluation module compares the measurement values to reference values prescribed by the rule.

The evaluation module or other processing device may perform the evaluation in response to a user request, based on pre-selected times and/or in response to one or more conditions.

The sensor of interest and the different sensor(s) can be located downhole, or located at the surface. The sensor of interest can also be located at the surface while the different sensor(s) are located downhole, or vice versa.

The following is a description of examples of rules that can be used to evaluate the plausibility of a measurement value. The examples are provided for illustrative purposes and are not intended to be limiting:

1) Downhole pressure readings are reasonable if the mud density at the sensor depth is within a selected band or range of expected mud density values (including cuttings) multiplied by True Vertical Depth (TVD) (plus optionally an assumed or pre-modeled extra factor for dynamic content based on flowrate measurements);

2) In overbalanced situations, if there is a non-zero flow rate of fluid (also referred to as mud) in a borehole, annular pressure measurements are plausible if they are lower than bore pressure at the same position or depth;

3) In dual WOB measurements above and below a component (e.g., a reamer), if the component is moving down (away from the surface), a measurement of the upper WOB is plausible if higher (minus buoyed weight in between) than the lower WOB. If the component is moving up (toward the surface), a measurement of the upper WOB is plausible if less than (minus buoyed weight in between) than the lower WOB;

4) If a string or component is moving up, then calibrated WOB readings are plausible if substantially positive. If the string or component is moving down, then calibrated WOB readings are plausible if substantially negative;

5) A bore temperature (e.g., within a drill string) and an annular temperature are plausible if the borehole temperature is similar to the annular temperature within a certain range;

6) Temperature measurements are plausible if the temperature measurements increase as depth increases;

7) If fluid circulation through a borehole is re-started after pumps are turned off and depth of a temperature sensor does not significantly change, then a temperature measurement is plausible if the temperature measurement decreases or is less than a temperature measurement taken when the pumps were off;

8) If a caliper is in a cased hole, caliper readings are plausible if close to (e.g., within a selected range of) an internal diameter of the casing;

9) Distributed temperature sensors along a string are plausible if uniformly continuous;

10) During managed pressure drilling (MPD), downhole annular pressure measurement values are plausible if the rate of change of downhole annular pressure sensor measurements are at least similar to the rate of change of pressure measurements at the surface;

11) Any magnetometer readings could be flagged "non-valid" when surface data and depth measurements suggest that there is steel nearby, e.g. when inside casing or passing another well nearby (This rule would not just only give input for downhole steering commands, but also for magnetometer-based stick-slip diagnostics);

12) Deep resistivity measurements are plausible if the variability of the deep resistivity measurements is lower than that of shallow resistivity measurements;
13) Dip measurements by imaging tools are plausible if they change when a BHA or other component changes direction;
14) Deep azimuthal resistivity may be implausible if the transmitter is bent relative to the receiver or vice versa;
15) Caliper measurement values are plausible if the caliper measurements read higher in sections that were subject to reaming;
16) Shallow measurements (e.g. resistivity, density, gamma imaging) might be implausible of they do not change when caliper or distance to the borehole wall is changed;
17) A downhole sensor measurement is plausible if the measurement agrees with historical data of the very same sensor (or reading dimension) at the same depth. For example, when relogging a well, a measurement from a directional sensor is plausible if in substantial agreement with previous recordings. The historical data comparison for this rule could also be considered for other sensor data. For example, if one or more different sensors show that the environment hasn't changed (e.g. mud density and type or mud ingress into the formation), then measurements taken during a relog that disagree with the same data taken previously may be implausible;
18) Downhole temperature measurements are plausible if the change in temperature measurements over depth is at or below a maximum gradient;
19) When a high viscosity pill is circulated past a pressure sensor (optionally into the annulus of a vertical hole section) during an operation, a pressure sensor reading is plausible if there is an increase (except when the operation causes a fracture and losses); and
20) When the pump rate is reduced through a motor BHA, a spectrogram of lateral vibration measurements should show a reduction in frequency in the peak for rotor excitation to be considered plausible.

Measurement data acquired from one or more different sensors may be used in combination with additional information for evaluation. For example, the measurement data may be input into a model describing the string, borehole and/or formation. In another example, the measurement data may be combined with stored or previous measurements, e.g., to provide an evolution of the measurements over time. This additional information can be used in conjunction with measurements from the different sensor(s) to generate and/or utilize rules that relate environmental conditions to plausible values.

The methods described herein can be performed automatically, e.g., at pre-selected times during the operation or in response to a trigger, such as the onset of a phase of the operation, a pause to add drill pipe, a measured parameter or condition, etc. For example, the methods can be performed when selected depths are reached or when a measurement value is within a predefined range. For example, the methods are used to perform depth-based checks with a depth sensor part of the surface system or the downhole system. Depth-based checks can include checks at regular depth intervals, at predefined depths or depth intervals, and/or on request (e.g., by downlink).

Figure 2:
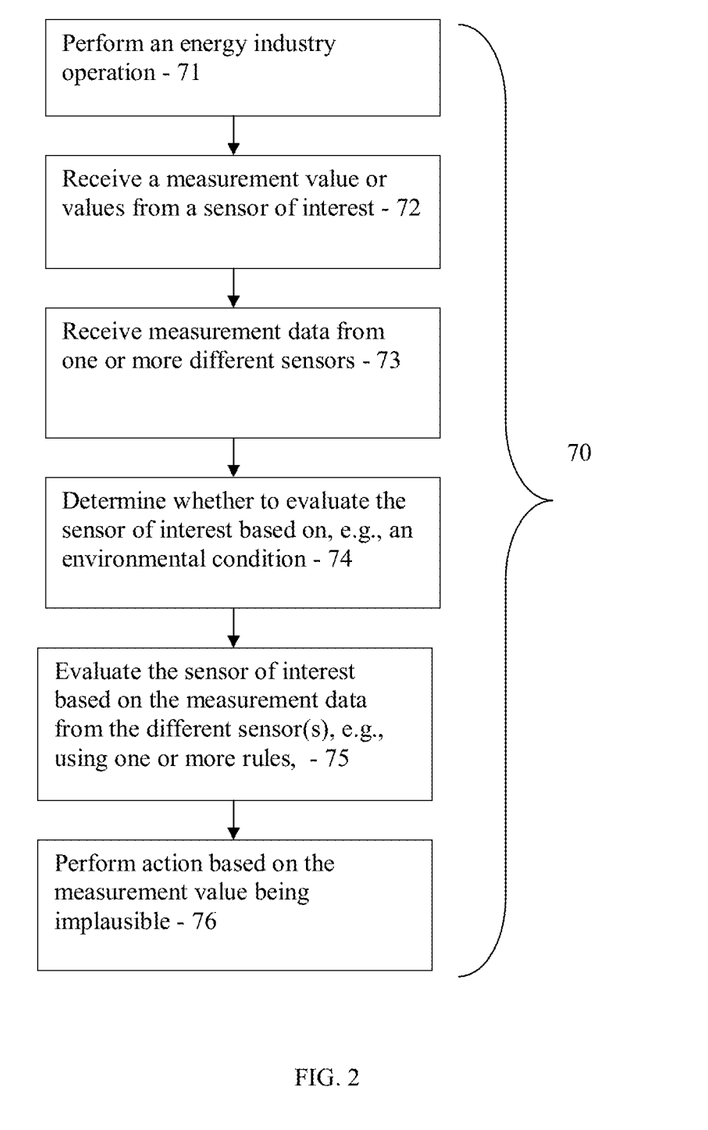
FIG. 2 is a flow chart providing an exemplary method of evaluating a sensor.

FIG. 2 illustrates a method 70 of evaluating a sensor. The method 70 is used in conjunction with the system 10, although the method 70 may be utilized in conjunction with any suitable combination of processors and networks. The method 70 includes one or more stages 71-76. In one embodiment, the method 70 includes the execution of all of stages 71-76 in the order described. However, certain stages may be omitted, stages may be added, or the order of the stages changed.

In the first stage 71, an energy industry operation, such as a drilling operation, is performed. Exemplary operations include drilling operations, LWD operations, wireline operations, completion operations, stimulation operations and others. In one embodiment, the energy industry operation is a drilling operation that includes deploying a borehole string such as the drillstring 14 in the borehole. Drilling mud and/or other fluids are circulated through the borehole 12 using one or more pumps 24. Prior to and/or during the operation, various operational parameters are selected, such as borehole trajectory, inclination, azimuth, toolface, depth, pumping speed, flow rate, weight-on-bit (WOB), torque-on-bit (TOB), rate of penetration (ROP), rotational velocity (rpm), vibration, and time parameters.

In the second stage 72, a measurement value is received or acquired by a first sensor (also referred to as a sensor of interest) during the operation. The measurement value represents a first parameter of a downhole environment. The first parameter may be related to the drill string or components thereof, related to borehole fluid (e.g., within the drill string and/or in an annular region), and/or related to formation properties.

A "measurement value" may be a single value taken at a particular time or depth, or may be multiple values. For example, the processing device receives multiple values at periodic times or substantially continuously, which allows for generating a curve, trend line or other data set describing the behavior or evolution of the measured parameter over time and/or depth.

The following examples are provided to illustrate the method. In a first example, the processing device receives a temperature value from a downhole temperature sensor. In a second example, a resistivity value (e.g., a shallow resistivity value) is received from a downhole resistivity measurement tool.

In the third stage 73, the processing device receives measurement data from a different sensor or different sensors. The measurement data may represent a different parameter, the same parameter taken at a different location or time (by the same sensor as the sensor of interest or a separate sensor configured to measure the same parameter).

For example, input to the processor from the different sensor(s) could be measurements made within the same time period, within the same depth interval, within the same rig status, within the same drilling status (e.g., Drilling, tripping, reaming, and the like), or otherwise properly grouped or classified to qualify them as suitable for evaluation of the sensor of interest.

In the first example, the measurement data from the different sensor is a measurement of bit depth, which may be measured downhole or at the surface. In the second example, the resistivity of drilling mud is measured, which can be measured downhole or at the surface.

In the fourth stage 74, the processing device determines whether the sensor of interest should be checked or evaluated. Determination as to whether a sensor should be checked and the evaluation steps is performed, in one embodiment, in real time during the operation.

In one embodiment, the processing device determines a condition related to the sensor of interest. If the condition is satisfied, the processing device is triggered or prompted to evaluate the sensor. The condition may be a time, depth, operational phase or environmental condition.

In the fifth stage 75, the measurement value from the sensor of interest and the measurement data from the different sensor or sensors (optionally in combination with additional information) are received at a processing device such as a sensor evaluation module, and an evaluation of the first sensor is performed.

In one embodiment, the evaluation includes selecting a rule that applies to the measurement data from the different sensor(s), and comparing the measurement value to values prescribed by the rule. If the measurement value satisfies the rule, then the measurement value is considered to be plausible.

In the first example, the processing device selects a rule that states the following:

IF pumps have started within a selected time prior to the measurement (e.g., in the last 30 min) AND the bit depth has not changed significantly, THEN the downhole temperature should decrease relative to the temperature before the pumps were started.

Based on this rule, the temperature value is compared to a temperature measured before the pumps were turned, and if the temperature is lower, the measurement value is considered to be plausible. If the temperature measurement is higher or about the same, then the temperature measurement is implausible and there might be a problem.

In the second example, the processing device selects a rule that states the following:

IF mud resistivity is below a certain value THEN measured apparent shallow resistivity should be below a selected value.

Based on this rule, the shallow resistivity value is compared to the selected value, and if the resistivity value is below the selected value, the measurement value is considered to be plausible. If the resistivity measurement is higher or about the same, then the temperature measurement is implausible and there might be a problem.

In the sixth stage 76, if the measurement value is implausible, various actions can be performed to determine the nature of the problem (e.g., damaged sensor, incorrect calibration) and/or address the problem. Examples of actions include presenting information to an operator, performing a self-check procedure, self-repair procedure, a re-calibration, performing measurement correction, and excluding measured data by the sensor of interest from the information that is to be transmitted. One or more of the actions may be executed in real-time, which allows action to be taken on the measurement of the first sensor while the operation (e.g., drilling operation) is ongoing.

If a measurement cannot be trusted, it does not necessarily mean that the useful lifetime of the evaluated measurement system has ended or that a sensor is damaged. For example, an implausible measurement could be an indication that the measurement system is operating in a non-suited environment or is mis-calibrated.

Other examples of actions that can be performed include flagging an implausible measurement for later processing or for exclusion from measurement data. Further examples include adjusting the evaluated sensor (e.g., re-calibrating) or adjusting operational parameters (e.g., fluid flow parameters, steering, WOB, TOB, rpm, rate of penetration etc.).

For example, if a sensor is found to output implausible readings, the processing device can automatically exclude the readings from that sensor from, e.g., use during the operation or use in subsequent analysis of the operation or formation.

In one embodiment, the systems and methods described herein are utilized in conjunction with a downhole operation, such as a drilling operation, wireline operation, production operation and others. In downhole operations, there can be an extremely limited bandwidth of telemetry compared to what is possible in other industries. For example, in situations when no wired connection is in place (e.g., mud pulse telemetry, electromagnetic telemetry, telemetry by drill string rotation variation, etc.) the bandwidth can be as low as within the range of just a few bits per second.

In addition, downhole operations with high complexity that need to be carefully controlled, and in particular automated procedures, can require a lot of data to be transmitted and received which can be difficult, infeasible or impossible due to the low telemetry rates described above.

For at least these reasons, it may be required or desired to limit the amount of data that is transmitted to the surface or to another location. Embodiments described herein aid in limiting transmitted data by sending only data that is plausible or to use only data (e.g. in automated procedures) that is considered plausible. Embodiments described herein reduce the amount of data that must be transmitted by reducing or eliminating data related to implausible measurements.

One or more aspects of the embodiments described herein can be included in an article of manufacture (e.g., one or more computer program products) having, for instance, computer usable media. The media has therein, for instance, computer readable instructions, program code means or logic (e.g., code, commands, rules, etc.) to provide and facilitate the capabilities of the present invention. The article of manufacture can be included as a part of a computer system or provided separately. These instructions may provide for equipment operation, control, data collection and analysis and other functions deemed relevant by a system designer, owner, user or other such personnel, in addition to the functions described in this disclosure.

Embodiment 1

A method of performing aspects of a downhole operation, the method comprising: receiving a measurement value from a first sensor configured to measure a parameter related to the downhole operation; receiving measurement data from a different sensor, the measurement data related to the downhole operation; and performing, by a sensor evaluation module, an evaluation of the first sensor, wherein the evaluation includes: determining a condition of the first sensor based on the measurement data from the different sensor; selecting a rule that prescribes a set of one or more measurement values of the parameter that are plausible if the condition is met; and determining whether the measurement value from the first sensor is plausible based on comparing the measurement value to the prescribed set of one or more measurement values.

Embodiment 2

The method of any prior embodiment, wherein the downhole operation is a drilling operation, and the first sensor is configured to be disposed in a borehole during the downhole operation.

Embodiment 3

The method of any prior embodiment, wherein the different sensor is configured to measure a different parameter than the parameter measured by the first sensor.

Embodiment 4

The method of any prior embodiment, wherein selecting the rule and determining whether the measurement value is plausible is performed at one or more pre-selected times during the operation, and/or in response to at least one of the measurement value from the first sensor, the measurement data from the different sensor, and measurement values from a third sensor that is different than the first sensor and the different sensor.

Embodiment 5

The method of any prior embodiment, wherein the first sensor, the different sensor, and the sensor evaluation module are disposed downhole during the downhole operation.

Embodiment 6

The method of any prior embodiment, wherein one of the first sensor and the different sensor is disposed at a surface location, and another of the first sensor and the different sensor is disposed downhole.

Embodiment 7

The method of any prior embodiment, wherein the measurement value is indicative of a rate of change of the parameter, and the prescribed set of measurement values includes plausible rates of change of the parameter.

Embodiment 8

The method of any prior embodiment, wherein the measurement value is considered to be plausible based on the measurement value corresponding to the prescribed set of one or more measurement values.

Embodiment 9

The method of any prior embodiment, further comprising performing at least one of: informing a user about the plausibility of the measurement value; excluding the measurement value from other measurement data; and adjusting an operational parameter of the downhole operation.

Embodiment 10

The method of any prior embodiment, further comprising performing at least one of a test and a calibration of the first sensor.

Embodiment 11

A system for performing aspects of a downhole operation, the system comprising: a first sensor configured to measure a parameter related to the downhole operation; a different sensor configured to generate measurement data related to the downhole operation; and a sensor evaluation module configured to receive a measurement value from the first sensor and the measurement data from the different sensor, the evaluation module configured to perform an evaluation of the first sensor, wherein the evaluation includes: determining a condition of the first sensor based on the measurement data from the different sensor; selecting a rule that prescribes a set of one or more measurement values of the parameter that are plausible if the condition is met; and determining whether the measurement value from the first sensor is plausible based on comparing the measurement value to the prescribed set of one or more measurement values.

Embodiment 12

The system of any prior embodiment, wherein the energy industry operation is a drilling operation, and the first sensor is configured to be disposed in a borehole during the drilling operation.

Embodiment 13

The system of any prior embodiment, wherein the different sensor is configured to measure a different parameter than the parameter measured by the first sensor.

Embodiment 14

The system of any prior embodiment, wherein selecting the rule and determining whether the measurement value is plausible is performed at one or more pre-selected times during the operation, and/or in response to at least one of the measurement value from the first sensor, the measurement data from the different sensor, and measurement values from a third sensor that is different than the first sensor and the different sensor.

Embodiment 15

The system of any prior embodiment, wherein the first sensor, the different sensor, and the sensor evaluation module are disposed downhole during the downhole operation.

Embodiment 16

The system of any prior embodiment, wherein one of the first sensor and the different sensor is disposed at a surface location, and another of the first sensor and the different sensor is disposed downhole.

Embodiment 17

The system of any prior embodiment, wherein the measurement value is indicative of a rate of change of the parameter, and the prescribed set of measurement values includes plausible rates of change of the parameter.

Embodiment 18

The system of any prior embodiment, wherein the measurement value is considered to be plausible based on the measurement value corresponding to the prescribed set of one or more measurement values.

Embodiment 19

The system of any prior embodiment, wherein the sensor evaluation module is configured to further perform at least one of: informing a user about the plausibility of the measurement value; excluding the measurement value from other measurement data; and adjusting an operational parameter of the downhole operation.

Embodiment 20

The system of any prior embodiment, further comprising performing at least one of a test and a calibration of the first sensor.

In support of the teachings herein, various analyses and/or analytical components may be used, including digital and/or analog systems. The system may have components such as a processor, storage media, memory, input, output, communications link (wired, wireless, pulsed mud, optical or other), user interfaces, software programs, signal processors (digital or analog) and other such components (such as resistors, capacitors, inductors and others) to provide for operation and analyses of the apparatus and methods disclosed herein in any of several manners well-appreciated in the art.

One skilled in the art will recognize that the various components or technologies may provide certain necessary or beneficial functionality or features. Accordingly, these functions and features as may be needed in support of the appended claims and variations thereof, are recognized as being inherently included as a part of the teachings herein and a part of the invention disclosed.

The use of the terms "a" and "an" and "the" and similar referents in the context of describing the invention (especially in the context of the following claims) are to be construed to cover both the singular and the plural, unless otherwise indicated herein or clearly contradicted by context. Further, it should further be noted that the terms "first," "second," and the like herein do not denote any order, quantity, or importance, but rather are used to distinguish one element from another. The modifier "about" used in connection with a quantity is inclusive of the stated value and has the meaning dictated by the context (e.g., it includes the degree of error associated with measurement of the particular quantity).

The teachings of the present disclosure may be used in a variety of well operations. These operations may involve using one or more treatment agents to treat a formation, the fluids resident in a formation, a wellbore, and/or equipment in the wellbore, such as production tubing. The treatment agents may be in the form of liquids, gases, solids, semi-solids, and mixtures thereof. Illustrative treatment agents include, but are not limited to, fracturing fluids, acids, steam, water, brine, anti-corrosion agents, cement, permeability modifiers, drilling muds, emulsifiers, demulsifiers, tracers, flow improvers etc. Illustrative well operations include, but are not limited to, hydraulic fracturing, stimulation, tracer injection, cleaning, acidizing, steam injection, water flooding, cementing, etc.

While the invention has been described with reference to an exemplary embodiment or embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the claims. Also, in the drawings and the description, there have been disclosed exemplary embodiments of the invention and, although specific terms may have been employed, they are unless otherwise stated used in a generic and descriptive sense only and not for purposes of limitation, the scope of the invention therefore not being so limited.

The invention claimed is:

1. A method of performing aspects of a downhole operation, the method comprising:

receiving a first measurement value from a first sensor configured to measure a first parameter related to the downhole operation;

receiving measurement data from a different sensor, the measurement data related to the downhole operation; and performing, by a sensor evaluation module, an evaluation of the first sensor, wherein the evaluation includes:

determining a condition of the first sensor based on the measurement data from the different sensor;

selecting a rule that prescribes a set of one or more reference values of the first parameter based on the measurement data from the different sensor;

comparing the first measurement value from the first sensor to the prescribed set of one or more reference values; and based on comparing the first measurement value from the first sensor to the prescribed set of one or more reference values, performing at least one of:

testing the first sensor, calibrating the first sensor, receiving a second measurement value from a second sensor configured to measure the first parameter, flagging the first measurement value, presenting information, performing a self-check procedure, performing a self-repair procedure, correcting the first measurement value, excluding the first measurement value, and adjusting a parameter of the downhole operation.

2. The method of claim 1, wherein the downhole operation is a drilling operation, and the first sensor is configured to be disposed in a borehole during the downhole operation.

3. The method of claim 1, wherein selecting the rule and comparing the first measurement value to the prescribed set of one or more reference values is performed at one or more pre-selected times during the downhole operation, and/or in response to at least one of the first measurement value from the first sensor, the measurement data from the different sensor, and measurement values from a third sensor that is different than the first sensor and the different sensor.

4. The method of claim 1, wherein the first sensor, the different sensor, and the sensor evaluation module are disposed downhole during the downhole operation.

5. The method of claim 1, wherein one of the first sensor and the different sensor is disposed at a surface location, and another of the first sensor and the different sensor is disposed downhole.

6. The method of claim 1, wherein the first measurement value from the first sensor is indicative of a rate of change of the first parameter, and the prescribed set of one or more reference values includes rates of change of the first parameter.

7. The method of claim 1, wherein the first measurement value from the first sensor is considered to be plausible based on the first measurement value from the first sensor corresponding to the prescribed set of one or more reference values.

8. The method of claim 1, further comprising determining whether the first measurement value from the first sensor is plausible based on comparing the first measurement value from the first sensor to the prescribed set of one or more reference values.

9. The method of claim 1, wherein the comparing the first measurement value from the first sensor to the prescribed set of one or more-reference values is performed in response to a trigger.

10. A system for performing aspects of a downhole operation, the system comprising:

a first sensor configured to measure a parameter related to the downhole operation;
a different sensor configured to generate measurement data related to the downhole operation; and
a sensor evaluation module configured to receive a first measurement value from the first sensor and the measurement data from the different sensor, the sensor evaluation module configured to perform an evaluation of the first sensor, wherein the evaluation includes:
determining a condition of the first sensor based on the measurement data from the different sensor;
selecting a rule that prescribes a set of one or more reference values of the first parameter based on the measurement data from the different sensor;
comparing the first measurement value from the first sensor to the prescribed set of one or more reference values; and
based on comparing the first measurement value from the first sensor to the prescribed set of one or more reference values, performing at least one of:
testing the first sensor, calibrating the first sensor, receiving a second measurement value from a second sensor configured to measure the first parameter, flagging the first measurement value, presenting information, performing a self-check procedure, performing a self-repair procedure, correcting the first measurement value, excluding the first measurement value, and adjusting a parameter of the downhole operation.

11. The system of claim 10, wherein the downhole operation is a drilling operation, and the first sensor is configured to be disposed in a borehole during the drilling operation.

12. The system of claim 10, wherein selecting the rule and comparing the first measurement value to the prescribed set of one or more reference values is performed at one or more pre-selected times during the downhole operation, and/or in response to at least one of the first measurement value from the first sensor, the measurement data from the different sensor, and measurement values from a third sensor that is different than the first sensor and the different sensor.

13. The system of claim 10, wherein the first sensor, the different sensor, and the sensor evaluation module are disposed downhole during the downhole operation.

14. The system of claim 10, wherein one of the first sensor and the different sensor is disposed at a surface location, and another of the first sensor and the different sensor is disposed downhole.

15. The system of claim 10, wherein the first measurement value from the first sensor is indicative of a rate of change of the first parameter, and the prescribed set of one or more reference values includes rates of change of the first parameter.

16. The system of claim 10, wherein the first measurement value from the first sensor is considered to be plausible based on the measurement value from the first sensor corresponding to the prescribed set of one or more reference values.

17. The system of claim 10, wherein the sensor evaluation module is configured to further perform determining whether the first measurement value from the first sensor is plausible based on comparing the first measurement value from the first sensor to the prescribed set of one or more reference values.

18. The system of claim 10, wherein the comparing the first measurement value from the first sensor to the prescribed set of one or more reference values is performed in response to a trigger.

19. The method of claim 1, wherein the different sensor is configured to measure a different parameter than the first parameter measured by the first sensor.

20. The system of claim 10, wherein the different sensor is configured to measure a different parameter than the parameter measured by the first sensor.

\* \* \* \* \*